US008914218B2

(12) United States Patent
Hironaga et al.

(10) Patent No.: US 8,914,218 B2
(45) Date of Patent: Dec. 16, 2014

(54) FOUR-STROKE CYCLE INTERNAL COMBUSTION ENGINE AND METHOD OF IDENTIFYING CYLINDER OF FOUR-STROKE CYCLE INTERNAL COMBUSTION ENGINE

(75) Inventors: Yukitaka Hironaga, Machida (JP); Noriaki Shimizu, Fujisawa (JP); Asako Shimizu, legal representative, Fujisawa (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 301 days.

(21) Appl. No.: 13/579,660

(22) PCT Filed: Dec. 7, 2010

(86) PCT No.: PCT/JP2010/071872
§ 371 (c)(1), (2), (4) Date: Aug. 17, 2012

(87) PCT Pub. No.: WO2011/104973
PCT Pub. Date: Sep. 1, 2011

(65) Prior Publication Data

US 2013/0041569 A1 Feb. 14, 2013

(30) Foreign Application Priority Data

Feb. 26, 2010 (JP) ................................ 2010-042568

(51) Int. Cl.

| | |
|---|---|
| ***G06F 19/00*** | (2011.01) |
| ***F02D 45/00*** | (2006.01) |
| *F02D 41/00* | (2006.01) |
| *F02D 41/06* | (2006.01) |

(52) U.S. Cl.
CPC ...... *F02D 41/009* (2013.01); *F02D 2041/0092* (2013.01); *F02D 2200/101* (2013.01); *F02D 2400/02* (2013.01); *F02D 41/062* (2013.01); *F02D 41/0097* (2013.01)
USPC .......................................................... 701/102

(58) Field of Classification Search
USPC ................................. 701/102, 110, 111, 115
See application file for complete search history.

(56) References Cited

U.S. PATENT DOCUMENTS 4,889,094 A 12/1989 Beyer et al.
5,271,362 A * 12/1993 Kobayashi et al. ........... 123/299
7,633,257 B2 * 12/2009 Sakamoto et al. .............. 701/22

FOREIGN PATENT DOCUMENTS

JP 8-6633 B2 1/1996
JP 10-122026 A 5/1998

(Continued)

OTHER PUBLICATIONS

Machine Translation of Japanese Patent 3998719, 8 pages.

(Continued)

*Primary Examiner* — Hieu T Vo
(74) *Attorney, Agent, or Firm* — Foley & Lardner LLP

(57) ABSTRACT

An internal combustion engine employs an odd number of cylinders. A crankangle sensor of 360° crankangle (CA) provides a POS signal including a pulse train having pulses generated at each 10° CA. This POS signal includes a specific portion 28' generated at each 360° CA by a gap portion of the crankangle sensor. The time required for a 10° CA change is calculated for each 10° CA as a second signal, and the time is integrated for intervals A, B, and C. Since the second signal oscillates with a period according to the number of the cylinders in response to a change in stroke of each cylinder, intervals T1 and T4, for example, can be identified by comparing the integrated values. Thus, the cylinders can be identified by only the signal from the crankangle sensor of 360° CA without depending on a cam angle sensor of 720° CA.

15 Claims, 2 Drawing Sheets

(56) References Cited

FOREIGN PATENT DOCUMENTS

| | | | |
|---|---|---|---|
| JP | 2000-500841 | A | 1/2000 |
| JP | 2000-352348 | A | 12/2000 |
| JP | 2005-240606 | A | 9/2005 |
| JP | 3998719 | B2 | 8/2007 |

OTHER PUBLICATIONS

Machine Translation of Japanese Patent Publication 10-122026, 18 pages.

* cited by examiner

FOUR-STROKE CYCLE INTERNAL COMBUSTION ENGINE AND METHOD OF IDENTIFYING CYLINDER OF FOUR-STROKE CYCLE INTERNAL COMBUSTION ENGINE

TECHNICAL FIELD

The present invention relates to a four-stroke cycle internal combustion engine that one operating cycle of events can be completed at each two revolutions of an engine crankshaft, that is, at 720 degrees of crankangle, and specifically to techniques for cylinder-identification in an internal combustion engine employing an odd number of cylinders, in particular, three cylinders, five cylinders, and the like.

BACKGROUND ART

To realize appropriate fuel-injection timing and appropriate ignition timing suited for a specified cylinder, a multi-cylinder internal combustion engine requires cylinder-identification for an engine cylinder to be brought into the next combustion stroke. Almost all of four-stroke cycle internal combustion engines employ a cam angle sensor configured to be synchronized with rotation of a camshaft that rotates in synchronism with rotation of a crankshaft such that one revolution of the camshaft is achieved at 720° crankangle, in addition to a crankangle sensor for detecting a rotational position of the crankshaft. In order to identify engine cylinders and also to identify the current position in phase in terms of crankangle during an operating cycle of each of the cylinders, such a four-stroke cycle internal combustion engine generally uses a pulse signal (unit pulses) generated from the crankangle sensor at each unit crankangle, often called “a POS signal”, as well as a pulse signal generated from the cam angle sensor at each interval between cylinders (i.e., at each phase difference between cylinders, for example, at each 180° crankangle in the case of a four-cylinder engine), often called “a PHASE signal”, the generated PHASE signals differing from each other.

In contrast to the above, Patent document 1 discloses a technique in which in a four-stroke cycle internal combustion engine employing an odd number of cylinders, a position in phase of each of the cylinders can be detected without depending on a cam angle sensor. This technique teaches the use of an intake manifold pressure signal (or an engine revolution speed signal), fluctuating in conjunction with each of operating cycles, in addition to the use of a unit pulse signal generated from a crankangle sensor having a pulse-defect portion, (i.e., a gap portion or a toothless portion) at each unit crankangle, thereby detecting a reversal between an increase and a decrease in the intake manifold pressure signal near the gap portion, generated at each 360° crankangle, or deriving an extreme (a local maximum or a local minimum) of a change in the intake manifold pressure near the gap portion. In this manner, the current stroke of the operating cycle of each of the cylinders is determined.

In the technique disclosed in the previously-discussed Patent document 1, a gradient of the intake manifold signal (or a gradient of the engine revolution speed signal) can be calculated by differentiating its signal value with respect to time, so as to detect a reversal between an increase and a decrease in the intake manifold pressure signal near the gap portion or calculate an extreme (a local maximum or a local minimum) of a change in the intake manifold pressure near the gap portion. However, the previously-discussed technique has the following drawbacks. Due to an unavoidable disorder of the intake manifold pressure signal, there is a possibility that a plurality of extremes (that is, a plurality of increase/decrease reversals) are detected. Due to a slight phase shift of the intake manifold pressure signal, there is a possibility that a gradient of the signal in a narrow range of pulse-defect portion (or in a narrow range of gap portion) is reversed. This leads to a deterioration in detection reliability, and hence it is impossible to more certainly achieve high-precision cylinder-identification.

Additionally, owing to the use of the derivative, which is the rate of change of the input signal with respect to time, even when the intake manifold pressure signal is used as the input signal, the derivative may be unavoidably affected by a change in engine revolution speed. For instance, in a transient operating situation, such as during cranking and starting period, due to a rapid engine-speed rise or undesirable engine-speed fluctuations, the detection accuracy may be further lowered.

CITATION LIST

Patent Literature

Patent document 1: Examined Japanese patent application publication No. 3998719

SUMMARY OF INVENTION

A four-stroke cycle internal combustion engine of the present invention employing an odd number of cylinders, comprises a crankangle sensor configured to output, responsively to rotation of a crankshaft, a first signal including a pulse train having pulses generated at each predetermined crankangle and also including a specific portion corresponding to a specified position in phase of a specified cylinder of the cylinders, a signal generating means for generating, responsively to the rotation of the crankshaft, a second signal related to an actual stroke of each of the cylinders and periodically oscillating with a period corresponding to the number of the cylinders, an integrating means for integrating the second signal for at least two intervals, each of which is preset based on the specific portion, used as a reference, in a manner so as to include either a ridge of the second signal or a trough of the second signal, thereby calculating an integrated value within each of the preset intervals, and a cylinder-identification means for identifying the cylinders by comparing the integrated values.

In a similar manner to the above, a cylinder-identification method of a four-stroke cycle internal combustion engine of the present invention employing an odd number of cylinders and configured to make a cylinder-identification based on a first signal including a pulse train having pulses generated at each predetermined crankangle and also including a specific portion at each 360° crankangle, and a second signal periodically oscillating according to the number of the cylinders, comprises calculating at least two integrated values, each of which corresponds to either a ridge of the second signal or a trough of the second signal, and identifying a position in phase of the specific portion during each cycle of 720 degrees of crankangle by comparing the integrated values.

As the second signal, for instance, an intake manifold pressure fluctuating in correlation with opening and closing operation of an intake valve of each of the cylinders (that is, an intake stroke of each of the cylinders) or an engine revolution speed microscopically fluctuating in correlation with a reaction on a compression stroke of each of the cylinders can be used. Each of the intake manifold pressure and the engine revolution speed periodically changes or oscillates according to the number of the cylinders. Hence, its integrated value is calculated for given intervals, for example, specified two intervals. Then, by comparing the integrated values, it is possible to more certainly determine or identify which of the two intervals corresponds to the ridge or the trough of the oscillating second signal or whether the previous interval of the two intervals corresponds to the ridge or the trough of the oscillating second signal, and whereby more accurate cylinder-identification can be achieved in conjunction with the position in phase of the specific portion of the first signal.

According to the invention, it is possible to more certainly realize cylinder-identification without depending on a cam angle sensor and also without being affected by a disorder of the second signal or a slight phase shift of the second signal.

DESCRIPTION OF EMBODIMENTS

Figure 1:
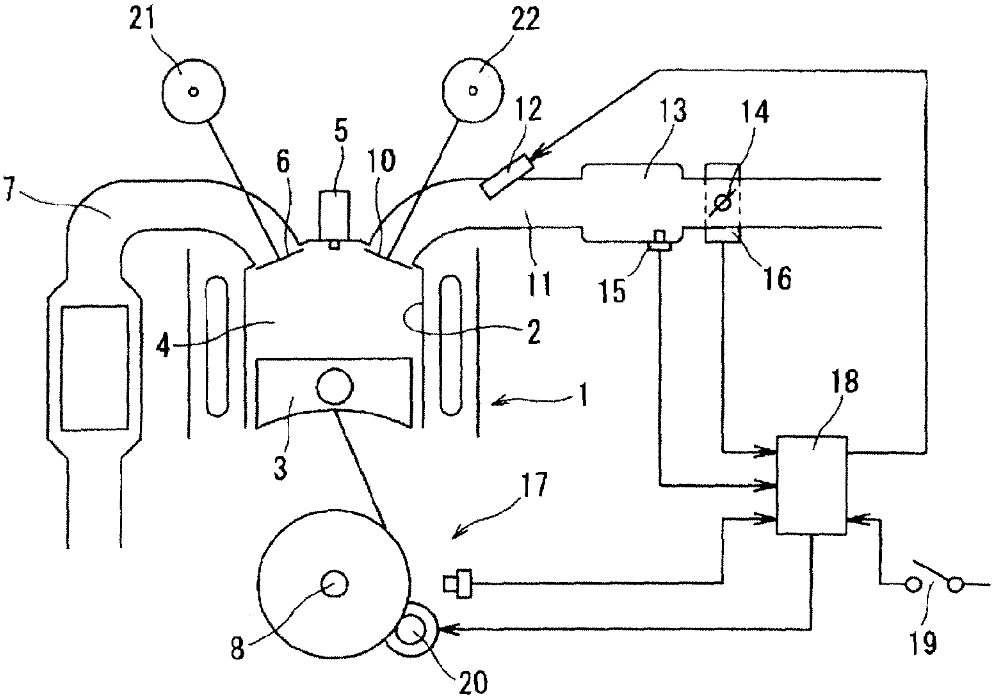
FIG. 1 is an explanatory view illustrating the system configuration of an embodiment of a four-stroke cycle internal combustion engine, made according to the invention.

Referring now to FIG. 1, there is shown the system configuration of one embodiment in which the inventive concept is applied to a spark-ignition four-stroke cycle internal combustion engine. In the shown embodiment, an internal combustion engine 1 employs three engine cylinders 2 arranged in-line. A piston 3 is slidably fitted into each of the cylinders 2 in a manner so as to define a combustion chamber 4. A spark plug 5 is arranged at the center of each of the cylinders. An exhaust passage 7 is connected through an exhaust valve 6 to the combustion chamber 4. An intake passage 11 is also connected through an intake valve 10 to the combustion chamber 4. A fuel injection valve 12 is disposed in the intake passage 11 in a manner so as to be oriented toward the intake valve 10 and provided for each individual engine cylinder. Additionally, a throttle valve 14 is interleaved in the intake passage and located upstream of a collector 13.

The opening of throttle valve 14 is detected by a throttle-valve opening sensor 16. An intake pressure sensor 15 is disposed in the collector 13 for detecting a pressure in the collector 13 as an intake manifold pressure. A crankangle sensor 17 (described later) is provided at one axial end of a crankshaft 8 for detecting an angular position of the crankshaft 8. Signals, detected by these sensors, are inputted into an engine control unit 18. Engine control unit 18 is configured to synthetically control, based on the detected signals, a fuel-injection amount to be injected by the fuel injection valve 12 and injection timing, and ignition timing of the spark plug 5. Furthermore, internal combustion engine 1 employs a well-known starting motor or a starter 20. Starting motor 20 is configured to operate responsively to a signal from a starter switch 19.

The above-mentioned exhaust valve 6 is driven (opened and closed) by an exhaust-valve side camshaft 21, whereas the above-mentioned intake valve 10 is driven (opened and closed) by an intake-valve side camshaft 22. These camshafts 21-22 rotates in synchronism with rotation of crankshaft 8, such that the camshafts are driven or rotated at ½ the rotating speed of the crankshaft 8 and thus one revolution of each of the camshafts is achieved at 720° crankangle. Particularly, the engine of the embodiment does not employ a cam angle sensor.

By the way, although the configuration of the embodiment is exemplified in a spark-ignition internal combustion engine, in a similar manner to the spark-ignition engine the inventive concept can be applied to a four-stroke cycle Diesel engine.

Figure 2:
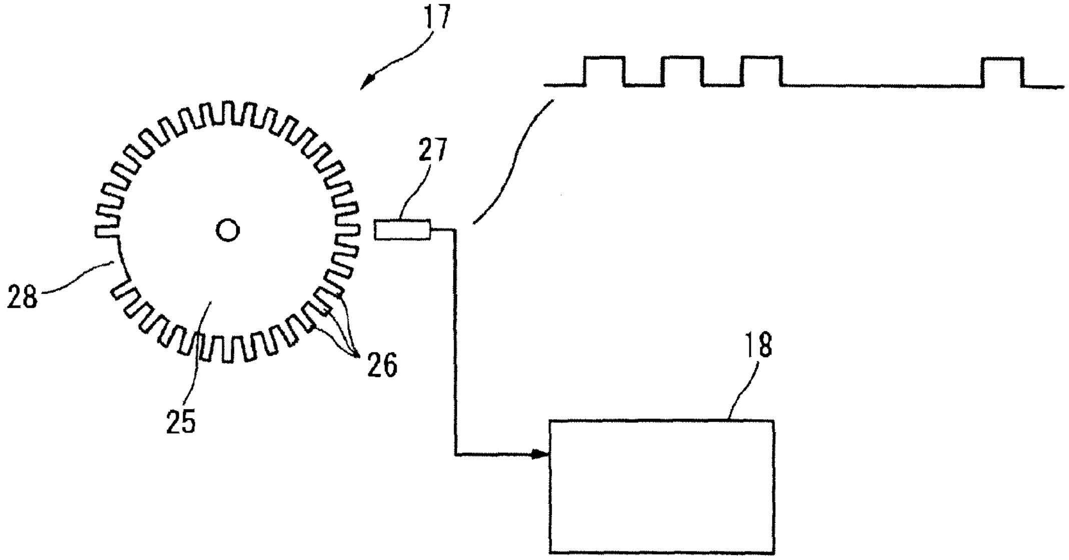
FIG. 2 is an explanatory view concerning the operational schematic of a crankangle sensor used in the embodiment.

Referring to FIG. 2, there is schematically shown the sensor system configuration of the previously-noted crankangle sensor 17. Crankangle sensor 17 is comprised of a circular toothed signal plate 25 fixedly connected to the axial end of crankshaft 8 and having a plurality of protrusions (protruding teeth) 26 circumferentially spaced apart from each other at a predetermined interval for example at an interval of 10 degrees, and a pickup portion 27, such as a Hall integrated circuit (Hall IC), for detecting each of the protrusions 26. Hence, crankangle sensor 17 generates a pulse signal (i.e., a POS signal) shown in the drawing. In addition to the above, as a gap portion (or a toothless portion) 28, two protrusions (two protruding teeth) 26 are removed at one specified position of one round (360 degrees) of the signal plate, and whereby a specific portion, used as a reference of the angular position of the crankshaft 8, is formed. By the way, in the shown embodiment, the specific portion is formed by the gap portion. In contrast to the above, the specific portion may be formed as a specified protrusion 26 of the protrusions, having a comparatively wide face width. In lieu thereof, a different pulse, which is generated by means of another pickup portion, may be used as a reference of the angular position of the crankshaft. In the previously-discussed embodiment, the specific portion provided at only one specified position of one round (360 degrees) of the signal plate. For another purpose different from the main purpose (i.e., cylinder-identification) of the engine system of the embodiment, an additional specific portion may be formed at an angular position different from the aforementioned specified position of one round (360 degrees) of the signal plate.

Figure 3:
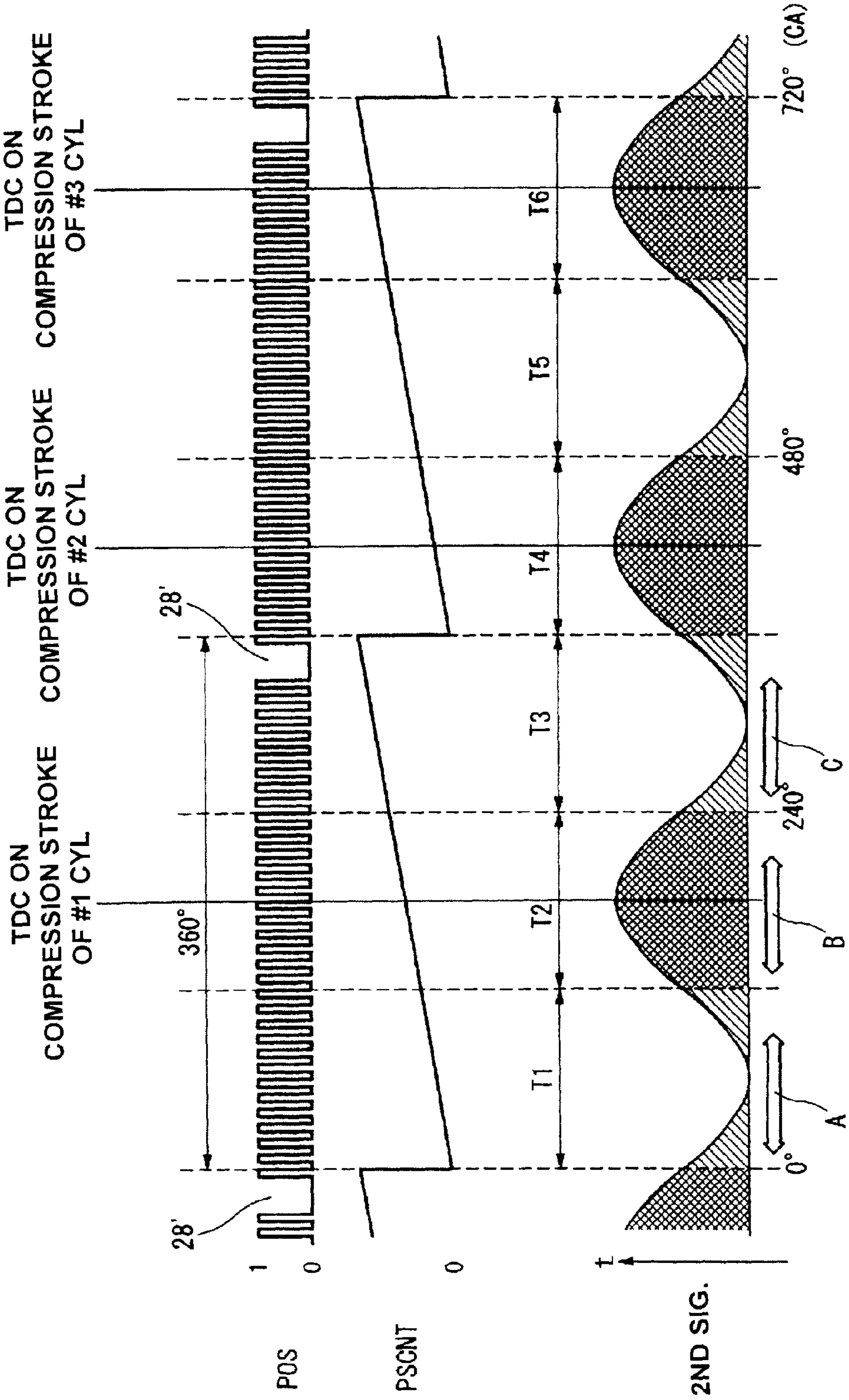
FIG. 3 is a waveform graph illustrating signal waveforms concerning first and second signals.

The cylinder-identification technique of the invention is hereunder explained in reference to FIG. 3.

FIG. 3 is a waveform graph or a time chart in which the abscissa indicates a crankangle. The uppermost-level signal waveform indicates a first signal, that is, the POS signal generated from the crankangle sensor 17. As seen from the waveform graph, the POS signal basically includes a pulse train having pulses generated at each 10° crankangle, and also includes a specific portion 28', that is to say, a pulse-defect portion, occurring at each 360° crankangle. The specific portion 28' can be easily identified by its pulse interval (its pulse spacing), differing from the other pulse interval. The pulse, which has first occurred immediately after the specific portion 28', is a reference pulse. In FIG. 3, for convenience, a crankangle of one reference pulse is indicated as “0° crankangle”. By the way, as seen from the waveform graph, the POS signal is outputted as pulses, each having a certain pulse width. On control, the timing of the trailing edge of a pulse is utilized. Thus, in the following discussion, the term “pulse” basically means a signal corresponding to the above-mentioned trailing edge but not having a pulse width. In the shown embodiment, pulses, generated from the crankangle sensor 17 at each 10° crankangle, are basically used as the POS signal. By further dividing each of the pulses, generated at each 10° crankangle, the POS signal may be generated as a pulse signal consisting of unit pulses generated at each smaller unit crankangle.

The in-line three-cylinder internal combustion engine of the embodiment uses a firing order of #1 cylinder→#2 cylinder→#3 cylinder. Also in FIG. 3, the timing of the top dead center (TDC) position of each individual cylinder is indicated. The specific portion 28' corresponds to a specified position in phase of a specified cylinder of the cylinders. For instance, in the shown embodiment, the position of the gap portion 28 of the crankangle sensor 17 with respect to the crankshaft 8 is positioned such that the reference pulse occurred immediately after the specific portion 28' corresponds to 180 degrees of crankangle before the TDC position of #1 cylinder on compression stroke. By the way, the relative-position relationship between the position of the specific portion 28' and each of the TDC positions of each individual cylinder is not limited to such a positional relationship as previously discussed. The relative-position relationship can be arbitrarily set.

Hereupon, one revolution of crankangle sensor 17 is achieved at 360° crankangle. The specific portion 28' occurs at each 360° crankangle. Even when the position of the specific portion 28' is set in a manner so as to correlate with the TDC position of #1 cylinder on compression stroke as discussed previously, the position in phase during one operating cycle corresponding to 720° crankangle cannot be identified by only the position of the specific portion. For instance, in FIG. 3, the point of time, at which the first reference pulse indicated as "0° crankangle" occurs, is 180° crankangle before the TDC position of #1 cylinder on compression stroke. However, the point of time, at which the second reference pulse occurs after 360° crankangle, is 60° crankangle before the TDC position of #2 cylinder on compression stroke. Thus, it is impossible to make a cylinder-identification and to identify a phase by only the POS signal from the crankangle sensor 17.

The sublevel of the time chart of FIG. 3 indicates a counted value of a counter PSCNT for counting the number of pulses of the POS signal. The counter PSCNT is reset to "0" by the above-mentioned reference pulse occurring immediately after the specific portion 28'. Therefore, the present position in phase in terms of crankangle with respect to the previously-discussed specific portion 28' (exactly, the reference pulse), used as a reference, can be represented by the counted value.

The lowermost-level signal waveform of FIG. 3 indicates a second signal periodically oscillating with a period corresponding to the number of the cylinders. In the shown embodiment, this signal is a signal corresponding to an engine revolution speed microscopically varying during the operating cycle. In particular, a real time, required for a 10° crankangle change for every 10° crankangle corresponding to the POS signal, is calculated, and then plotted such that the abscissa is taken as a crankangle and the ordinate is taken as a real time required for a unit crankangle. Hence, strictly speaking, the plotted graph becomes a graph of discrete values. However, in FIG. 3, the calculated real-time signal waveform is schematically drawn as a smooth and indiscrete (continuous) curve (the lower part than the peak of the trough is not shown). That is, if one engine cylinder is considered, the engine revolution speed tends to microscopically lower near the TDC position on compression stroke due to work of compression. In the case of the three-cylinder engine, each of the cylinders reaches the TDC position with a phase-shift of 240° crankangle. During one operating cycle of 720 degrees of crankangle, an oscillatory waveform having three ridges and three troughs can be obtained. Therefore, the oscillatory waveform reflects an actual stroke of each individual engine cylinder with respect to rotation of the crankshaft 8. The period of this oscillatory waveform becomes a period corresponding to the number of the cylinders. As can be appreciated from the waveform graph of FIG. 3, when dividing the graph by a given crankangle of 360 degrees, the oscillatory waveforms obtained at each given crankangle (360 degrees) tend to differ from each other, since the number of the cylinders is an odd number.

As can be easily appreciated from the previously-noted graph, regarding the revolution speed, the speed is low within the ridge of the signal wave, while the speed is high within the trough of the signal wave. There is no essential difference between the signal wave graph and the engine revolution speed characteristic itself. However, according to the previously-noted real-time calculation method for every 10° crankangle corresponding to the POS signal, it is possible to obtain both the first signal and the second signal from only the crankangle sensor 17 as a substantial sensor without depending on any rotational speed detection means except the crankangle sensor 17. Thus, the previously-discussed method has a merit that desired cylinder-identification and identification of a position in phase during the operating cycle are both completed by means of only the crankangle sensor 17.

Also, the above-mentioned engine revolution speed characteristic is basically unchanged, regardless of during cranking or motoring without explosive combustion or during normal running of the engine with explosive combustion. Under the operating condition with explosive combustion, the speed on combustion stroke tends to become higher, but there is a less change in each of the positions of the ridge and the trough in phase. That is, irrespective of with explosive combustion or without explosive combustion, the waveform concerning the engine revolution speed is almost the same.

For the purpose of simplification of the disclosure, the intervals T1 to T6, shown in FIG. 3, are obtained by dividing one cycle of 720 degrees of crankangle into every 120 degrees. Actually, these intervals are comprised of 120°-crankangle concave-down intervals (i.e., intervals T2, T4, and T6 in the waveform graph), each of which is preset to extend from 60 degrees of crankangle before the TDC position of each individual engine cylinder to 60 degrees of crankangle after the TDC position, and 120°-crankangle concave-up intervals (i.e., intervals T1, T3, and T5 in the waveform graph), each of which is sandwiched between the above-mentioned concave-down intervals. As seen from the waveform graph, the former intervals T2, T4, and T6, each center of which corresponds to the TDC position of each individual engine cylinder, include the respective ridges of the oscillatory waveform of the second signal. The latter intervals T1, T3, and T5 include the respective trough of the oscillatory waveform of the second signal. Hence, when integrating the second signal with respect to crankangle within each of the six intervals, the integrated value (see the cross-hatching area in the waveform graph) within each of the former intervals T2, T4, and T6 tends to become great. In contrast, the integrated value (see the right-hand diagonal shading area in the waveform graph) within each of the latter intervals T1, T3, and T5 tends to become small. By the way, in the shown embodiment, the second signal corresponds to a real time, required for a 10° crankangle change for every 10° crankangle. Thus, regarding the actual integrating process, integral computation is triggered or initiated by each of the unit pulses included in the POS signal, and the real-time duration is calculated for every 10° crankangle. Then, the real time, calculated every unit crankangle, is integrated consecutively.

According to the embodiment of the invention, the integrated value of a certain interval is compared to the integrated value of an interval before 360 degrees of crankangle with respect to the certain interval. For instance, the integrated value of a certain interval (e.g., the interval Tl or the interval T4) immediately after one specific portion 28' is compared to the integrated value of an interval (e.g., the interval T4 or the interval T1) immediately after another specific portion 28' before 360 degrees of crankangle. As a comparison result of this, when the integrated value obtained at the current integration cycle becomes greater than the integrated value obtained at the previous integration cycle (before 360 degrees of crankangle), it becomes clear that the certain interval is not the interval T1, but the interval T4. Therefore, at the point of time when the integral computation and comparing operation have been completed (for instance, immediately after the end of the interval T4), it is possible to identify the engine cylinder, which is brought into the next combustion stroke, as #3 cylinder, and also to specify or identify the current position in phase of each of the cylinders. Conversely when the integrated value obtained at the current integration cycle becomes less than the integrated value obtained at the previous integration cycle (before 360 degrees of crankangle), it is identified that the certain interval is not the interval T4, but the interval T1.

As a method of comparing the two integrated values, the magnitudes of these integrated values may be simply compared as discussed previously. In lieu thereof, another method that calculates a ratio of the two integrated values may be used. Alternatively, to avoid incorrect identifications, when either the difference between the two integrated values or the ratio of the two integrated values is less than its predetermined threshold value, a final decision regarding cylinder-identification may be suspended.

According to the previously-discussed method of comparing the integrated values of a plurality of intervals, spaced apart from each other 360 degrees of crankangle, as an angular range of crankangle sensor 17 and crankshaft 8, the integrated values of the completely same interval can be compared, and thus errors, occurring due to various factors, may cancel out each other. Therefore, this method has a merit that higher cylinder-identification accuracy can be obtained.

In the previously-discussed comparative method, the integrated values of two intervals, spaced apart from each other 360 degrees of crankangle, are compared. In lieu thereof, the integrated values of three or more intervals may be compared. For instance, when consecutively comparing the integrated value obtained at the current integration cycle, the integrated value obtained at the previous integration cycle (one integration cycle before or 360° crankangle before), and the integrated value obtained two integration cycles before (i.e., 720° crankangle before), the magnitudes of these integrated values alternate with each other. Hence, it is possible to more accurately identify whether the current interval is the interval T1 or the interval T4, and thus incorrect identifications, which may occur owing to a certain disturbance, can be avoided.

Regarding the two intervals T2 and T5, spaced apart from each other 360 degrees of crankangle, or regarding the two intervals T3 and T6, cylinder-identification can be achieved by the completely same method. The position in phase of the interval T2 (or T5) and the position in phase of the interval T3 (or T6) with respect to the specific portion 28', used as a reference, can be specified or identified by the counted value of counter PSCNT. Therefore, cylinder-identification can be repeatedly executed, each time the crankshaft 8 rotates 120 degrees of crankangle.

In the other embodiment of the invention, the integrated value of a certain interval is compared to the integrated value of an interval adjacent to and immediately before the certain interval. For instance, the integrated value of the current interval (e.g., T1 or T4) immediately after the specific portion 28' is compared to the integrated value of the previous interval (e.g., T6 or T3) immediately before the current interval. As a comparison result of this, when the integrated value of the current interval becomes greater than that of the previous interval, it becomes clear that the current interval is not the interval T1, but the interval T4. Therefore, at the point of time when the integral computation and comparing operation for these two intervals have been completed (for instance, immediately after the end of the interval T4), it is possible to identify the engine cylinder, which is brought into the next combustion stroke, as #3 cylinder, and also to specify or identify the current position in phase of each of the cylinders. Conversely when the integrated value of the current interval becomes less than that of the previous interval, it is identified that the current interval is not the interval T4, but the interval T1.

In a similar manner to the above, as a method of comparing the two integrated values, the magnitudes of these integrated values may be simply compared as discussed previously. In lieu thereof, another method that calculates a ratio of the two integrated values may be used. Alternatively, to avoid incorrect identifications, when either the difference between the two integrated values or the ratio of the two integrated values is less than its predetermined threshold value, a final decision regarding cylinder-identification may be suspended.

According to the previously-discussed method of comparing the integrated values of a plurality of intervals, adjacent to each other, the comparing operation between the integrated values can be completed for a relatively short time period without requiring one revolution of crankshaft 8. Thus, this method is advantageous with respect to initial cylinder-identification during an early stage of starting period. Also, this method is hard to be affected by a macroscopic change in engine revolution speed (for example, an engine revolution speed change occurring during accelerating/decelerating operation).

By the way, in the other embodiment, the integrated values of the two adjacent intervals are compared to each other. In lieu thereof, the integrated values of three or more adjacent intervals may be compared to each other. For instance, as can be seen from the three adjacent intervals T1, T2, and T3 in the waveform graph, the magnitudes of these integrated values alternate with each other. Hence, it is possible to more accurately identify whether the current interval is the interval T1 or the interval T4, and thus incorrect identifications, which may occur owing to a certain disturbance, can be avoided.

The previously-discussed interval, within which integral computation is executed for cylinder-identification, does not necessarily need to be 120° crankangle, which is obtained by dividing one operating cycle of 720 degrees of crankangle into six parts. Executing integral computation within specified intervals, which respectively substantially correspond to the ridge and the trough of the second signal, is sufficient for cylinder-identification. That is, each specified interval may be an angular range greater than or equal to 120 degrees of crankangle or an angular range less than or equal to 120 degrees of crankangle. The interval, within which integral computation is executed, may be asymmetrical with respect to the center of each of intervals T1 to T6. The intervals, indicated by the arrows A, B, and C in FIG. 3, show preferable intervals of integration during 360 degrees of crankangle. The interval A corresponds to 80 degrees of crankangle, ranging from 10° crankangle to 90° crankangle, on the assumption that the reference pulse, which has first occurred immediately after the specific portion 28', is 0° crankangle. In a similar manner, the interval B corresponds to 80 degrees of crankangle, ranging from 130° crankangle to 210° crankangle, and the interval C corresponds to 80 degrees of crankangle, ranging from 250° crankangle to 330° crankangle. In the case of the above-mentioned setting, the integration-interval C as well as the other two intervals does not overlap with the specific portion 28' (that is, the pulse-defect portion). Thus, it is possible to calculate a real time corresponding to a time duration between the adjacent pulses and to integrate the calculated real-time durations, while simply utilizing the POS signal itself including the specific portion 28'.

Furthermore, each of the above-mentioned intervals A, B, and C may be variably set depending on an engine operating condition (e.g., engine coolant temperature, oil temperature, oil pressure, and the like).

As appreciated from the above, as a matter of course, the cylinder-identification technique of the embodiment can be applied to an engine construction with no cam angle sensor whose one revolution is achieved at 720° crankangle. Additionally, the cylinder-identification technique of the embodiment can be applied as a back-up function in the presence of a cam-angle sensor failure or an abnormality in the cam-angle sensor system, in an engine construction employing a cam angle sensor as well as crankangle sensor 17. Also, the cylinder-identification technique of the embodiment may be utilized for a diagnosis on a failure or an abnormal condition of the cam angle sensor. By the way, in the case of the previously-noted cam-angle-sensor equipped engine construction, cylinder-identification is carried out according to the previously-discussed method simultaneously when the engine is normally running, each of the intervals A, B, and C may be learning-controlled or learning-compensated with respect to an engine-temperature condition such that these intervals can be optimized.

In the embodiment shown in FIG. 3, a real time, required for a unit crankangle change for every unit crankangle (for example, for every 10° crankangle), is calculated, and then the calculated real time is integrated consecutively. In lieu thereof, a ratio of the real-time duration calculated one execution cycle before and the real-time duration calculated at the current execution cycle is calculated. Then, the calculated ratio, regarded as the second signal, may be integrated consecutively. Concretely, within each of the intervals A, B, and C, a current time duration $t_n$ from the previous POS-signal input to the current POS-signal input is calculated each time the POS signal is inputted. Additionnally, a ratio ($t_n/t_{n-1}$) of the current time duration $t_n$ to the previous time duration $t_{n-1}$, which has already been calculated in the same manner as the current time duration, is calculated. Then, the ratio, calculated for every POS-signal input, is integrated consecutively. In this manner, the integrated value within each of the intervals can be calculated.

As set forth above, in the case that the real-time ratio of the real times, calculated for every unit crankangle, is used as the second signal, the second signal can be non-dimensionalized. Thus, it is possible to avoid the cylinder-identification accuracy from being affected by a macroscopic change in engine revolution speed rather than a fluctuation in engine revolution speed microscopically fluctuating during the operating cycle. For instance, in a situation where the engine is cranking by means of the starter 20 during the engine starting period, a rapid engine-speed change (a rapid speed rise) occurs, and thus the accuracy of cylinder-identification, which utilizes a fluctuation in engine revolution speed during the operating cycle, tends to lower. In such a situation, by utilizing the previously-discussed real-time ratio, it is possible to suppress the cylinder-identification accuracy from being affected by such a rapid speed rise, as much as possible.

As the second signal, a fluctuation in intake manifold pressure detected by intake pressure sensor 15 as well as the previously-discussed engine revolution speed can be utilized. The intake pressure in the collector 13, to which the intake passage 11 provided for each individual engine cylinder is connected, oscillates periodically responsively to an intake stroke of each of the cylinders. The oscillation characteristic is basically similar to the signal waveform shown in FIG. 3, and thus tends to periodically oscillate with a period corresponding to the number of the cylinders, while reflecting the actual stroke of each of the cylinders. Therefore, according to the completely same method as the previously-described embodiment, cylinder-identification can be achieved. However, in the case of the utilization of intake manifold pressure, a time delay between the actual stroke and the ridge/trough of the oscillatory waveform of intake manifold pressure occurs due to the length of the intake manifold. The integration-intervals A, B, and C have to be set, fully taking account of the time delay. Additionally, the time delay is a real time, in other words, the real time is affected by the time delay, and thus it is desirable to compensate for the setting of each of the integration-intervals depending on the engine revolution speed.

According to the previously-discussed method that utilizes intake manifold pressure, there is a less possibility that the integrated value of the second signal integrated with respect to crankangle is affected by a change in engine revolution speed (in particular, a macroscopic speed change). For instance, even during cranking that engine revolution speed greatly changes, it is possible to ensure the high cylinder-identification accuracy.

While the foregoing is a description of the preferred embodiments carried out the invention, it will be understood that the invention is not limited to such a three-cylinder internal combustion engine of the embodiment shown and described herein. The inventive concept may be applied to another internal combustion engine employing an odd number of cylinders, for example a five-cylinder internal combustion engine. The odd number of cylinders should be merely brought into combustion stroke one by one, and thus it is unnecessary to limit the engine-cylinder arrangement to an in cylinder multi-cylinder engine.

The invention claimed is:

1. A four-stroke cycle internal combustion engine employing an odd number of cylinders, comprising:

a crankangle sensor configured to output, responsively to rotation of a crankshaft, a first signal including a pulse train having pulses generated at each predetermined crankangle and also including a specific portion corresponding to a specified position in phase of a specified cylinder of the cylinders;

a signal generating means for generating, responsively to the rotation of the crankshaft, a second signal related to an actual stroke of each of the cylinders and periodically oscillating with a period corresponding to the number of the cylinders in a manner so as to have an extreme near a top dead center position on compression stroke of each of the cylinders and have an extreme near a midpoint of the top dead center positions adjacent to each other;

an integrating means for integrating the second signal for at least two intervals, which intervals are preset based on the specific portion, used as a reference, in a manner so as to include a ridge and a trough of the second signal such that the extremes are arranged substantially in centers of the respective intervals, thereby calculating an integrated value within each of the preset intervals; and a cylinder-identification means for making a cylinder-identification by comparing the integrated values.

2. The four-stroke cycle internal combustion engine as claimed in claim 1, wherein:

the integrated values within each of the preset intervals, which intervals are spaced apart from each other 360 degrees of crankangle, are used.

3. The four-stroke cycle internal combustion engine as claimed in claim 1, wherein:

the integrated values within each of the preset intervals, which intervals include at least a first interval including a first ridge or trough and a second interval including a second trough or ridge being continuous with the first ridge or trough, are used.

4. The four-stroke cycle internal combustion engine as claimed in claim 1, wherein:

the integrated value is calculated by consecutively integrating a real time, required for a unit crankangle change, for every predetermined unit crankangle.

5. The four-stroke cycle internal combustion engine as claimed in claim 1, wherein:

the integrated value is calculated by consecutively integrating a ratio of a real time, required for a current unit crankangle change, and a real time, required for a previous unit crankangle change, for every predetermined unit crankangle.

6. The four-stroke cycle internal combustion engine as claimed in claim 1, wherein:

the specific portion corresponds to a pulse-defect portion of the pulse train generated by the crankangle sensor;

the integrated value is calculated by integrating a real time corresponding to a time duration between the adjacent pulses, for every pulse input from the crankangle sensor; and the intervals are preset so as not to overlap with the specific portion.

7. The four-stroke cycle internal combustion engine as claimed in claim 1, wherein:

the cylinder-identification is made by comparing the integrated values for the same intervals during cranking or motoring without combustion as well as during normal running with combustion.

8. A cylinder-identification method of a four-stroke cycle internal combustion engine employing an odd number of cylinders and configured to make a cylinder-identification based on a first signal including a pulse train having pulses generated at each predetermined crankangle and also including a specific portion at each 360° crankangle, and a second signal periodically oscillating according to the number of the cylinders, comprising:

generating, responsively to rotation of a crankshaft, the second signal related to an actual stroke of each of the cylinders and periodically oscillating with a period corresponding to the number of the cylinders in a manner so as to have an extreme near a top dead center position on compression stroke of each of the cylinders and have an extreme near a midpoint of the top dead center positions adjacent to each other;

calculating an integrated value within each of at least two intervals, which intervals are preset based on the specific portion, used as a reference, in a manner so as to include a ridge and a trough of the second signal such that the extremes are arranged substantially in centers of the respective intervals; and identifying a position in phase of the specific portion during each cycle of 720 degrees of crankangle by comparing the integrated values.

9. A four-stroke cycle internal combustion engine employing an odd number of cylinders, comprising:

a crankangle sensor configured to output, responsively to rotation of a crankshaft, a first signal including a pulse train having pulses generated at each predetermined crankangle and also including a specific portion corresponding to a specified position in phase of a specified cylinder of the cylinders;

a signal generator for generating, responsively to the rotation of the crankshaft, a second signal related to an actual stroke of each of the cylinders and periodically oscillating with a period corresponding to the number of the cylinders in a manner so as to have an extreme near a top dead center position on compression stroke of each of the cylinders and have an extreme near a midpoint of the top dead center positions adjacent to each other;

an integrator for integrating the second signal for at least two intervals, which intervals are preset based on the specific portion, used as a reference, in a manner so as to include a ridge and a trough of the second signal such that the extremes arc arranged substantially in centers of the respective intervals, thereby calculating an integrated value within each of the preset intervals; and a cylinder-identification circuit for making a cylinder-identification by comparing the integrated values.

10. The four-stroke cycle internal combustion engine as claimed in claim 9, wherein:

the integrated values within each of the preset intervals, which intervals are spaced apart from each other 360 degrees of crankangle, are used.

11. The four-stroke cycle internal combustion engine as claimed in claim 9, wherein:

the integrated values within each of the preset intervals, which intervals include at least a first interval including a first ridge or trough and a second interval including a second trough or ridge being continuous with the first ridge or trough, are used.

12. The four-stroke cycle internal combustion engine as claimed in claim 9, wherein:

the integrated value is calculated by consecutively integrating a real time, required for a unit crankangle change, for every predetermined unit crankangle.

13. The four-stroke cycle internal combustion engine as claimed in claim 9, wherein:

the integrated value is calculated by consecutively integrating a ratio of a real time, required for a current unit crankangle change, and a real time, required for a previous unit crankangle change, for every predetermined unit crankangle.

14. The four-stroke cycle internal combustion engine as claimed in claim 9, wherein:

the specific portion corresponds to a pulse-defect portion of the pulse train generated by the crankangle sensor;

the integrated value is calculated by integrating a real time corresponding to a time duration between the adjacent pulses, for every pulse input from the crankangle sensor; and the intervals are preset so as not to overlap with the specific portion.

15. The four-stroke cycle internal combustion engine as claimed in claim 9, wherein:

the cylinder-identification is made by comparing the integrated values for the same intervals during cranking or motoring without combustion as well as during normal running with combustion.

* * * * *